United States Patent [19]

Schoen

[11] Patent Number: 5,537,319
[45] Date of Patent: Jul. 16, 1996

[54] METHOD FOR LOAD BALANCING SEISMIC MIGRATION PROCESSING ON A MULTIPROCCESSOR COMPUTER

[75] Inventor: Eric J. Schoen, Austin, Tex.

[73] Assignee: Schlumberger Technology Corporation, Austin, Tex.

[21] Appl. No.: 224,603

[22] Filed: Apr. 7, 1994

Related U.S. Application Data

[63] Continuation-in-part of Ser. No. 160,123, Dec. 1, 1993, abandoned.

[51] Int. Cl.$^6$ .................................................. G06F 19/00
[52] U.S. Cl. ........................................................ 364/421
[58] Field of Search .................................. 364/421, 422; 395/929

[56] References Cited

U.S. PATENT DOCUMENTS

| | | |
|---|---|---|
| 4,598,400 | 7/1986 | Hillis . |
| 4,773,038 | 9/1988 | Hillis et al. . |
| 4,827,403 | 5/1989 | Steele, Jr. et al. . |
| 5,128,899 | 7/1992 | Boyd et al. . |
| 5,148,406 | 9/1992 | Brink et al. . |
| 5,150,331 | 9/1992 | Harris et al. . |
| 5,198,979 | 3/1993 | Moorehead et al. . |

FOREIGN PATENT DOCUMENTS

| | | |
|---|---|---|
| 2236393 | 4/1991 | United Kingdom . |
| 8800711 | 1/1988 | WIPO . |
| 9313434 | 7/1993 | WIPO . |

OTHER PUBLICATIONS

Vijay K. Madisetti et al., "Seismic Migration Algorithms Using The FFT Approach On The NCUBE Multiproccessor", ICASSP '88: Acoustics, Speech & Signal Processing Conference, 1988, pp. 894–897.

Vijay K. Madisetti et al., "Seismic Migration Algorithms On Multiprocessors", ICASSP '88: Acoustics, Speech & Signal Processing Conference, 1988, pp. 2124–2127.

Brian Kelley et al., "High Speed Migration Of Multidimensional Seismic Data", ICASSP '91: Acoustics, Speech & Signal Processing Conference, 1991 pp. 1117–1120.

Deregowski, S. and Rocca, F., 1981. Geometrical optics and wave theory for costant–offset sections in layered media. *I Geophysical Prospecting*, 29, 374–387.

Hillis, W. Daniel and Tucker, Lewis W. The CM–5 Connection Machine: A Scalable Supercomputer, *Communications of the ACM*, Nov. 1993, vol. 36, No. 11, pp. 31–40.

United States Statutory Invention Registration, Berryhill et al., Reg. No. H482, Published Jun. 7, 1988.

Highnam, P. T. and Pieprzak, A. Implementation of a Fast, Accurate 3-D Migration on a Massively Parallel Computer, *Proceedings of 61st Annual International SEG Meeting*, Nov. 13, 1991, vol. 1, 338–340.

(List continued on next page.)

*Primary Examiner*—Donald E. McElheny, Jr.
*Attorney, Agent, or Firm*—Charles D. Huston

[57] ABSTRACT

This invention provides a means for balancing the computational workload of individual processing nodes of a multiprocessor computer, such as a massively parallel processor (MPP), when executing a seismic migration program. Groups of prestack seismic traces are loaded into "input" nodes of the MPP. The "input" nodes examine the traces to determine which bins in the seismic survey are covered by the traces, and how many traces cover each bin. Each input node then broadcasts to all other nodes a description of the trace coverage. All nodes use the information in each broadcast to determine how many bins will be assigned to each "operator" node that will process the prestack data to produce poststack data. The bin assignment is designed to equalize the number of traces that each operator node processes. Thus, the invention provides a means for maximizing the efficiency with which an MPP can perform seismic migration processing, and is applicable to wide variety of MPPs and processing algorithms.

13 Claims, 14 Drawing Sheets

OTHER PUBLICATIONS

Meinardus, H. A. and K. L. Schleicher, Jul. 1993. 3–D time–variant dip moveout by the f–k method, *Geophysics*, vol. 58, No. 7, 1030–1041.

Reshef, M., Aug. 1991. Prestack depth imaging of three–dimensional shot gathers. *Geophysics*, vol. 56, No. 8, 1158–1163.

Reynolds, S. Jun. 1993. Parallel computing in seismic data processing. *The Leading Edge*, vol. 12, No. 6, 687–692.

International Preliminary Examination Report dated Aug. 2, 1995, PCT International Application No. PCT/US94/13704, Schlumberger Technology Corporation, filed Jan. 12, 1994.

METHOD FOR LOAD BALANCING SEISMIC MIGRATION PROCESSING ON A MULTIPROCCESSOR COMPUTER

This application is a continuation-in-part of U.S. patent application Ser. No. 08/160,123 filed De. 1, 1993, now abandoned.

TECHNICAL FIELD

This invention relates to seismic data processing on multiprocessor computers. In particular, the current invention relates to a method of balancing the computational load of Kirchhoff-style seismic migration processing across multiple processors on a multiprocessor computer.

BACKGROUND OF THE INVENTION

Seismic Acquisition & Processing

The Earth's subsurface can be imaged by a seismic survey, therefore, seismic data acquisition and processing are key components in geophysical exploration. In a seismic survey, elastic acoustic waves are generated by a source at the Earth's surface and the waves are radiated into the Earth's subsurface. For land seismic surveys, the usual source is dynamite or a seismic vibrator, while for a marine seismic survey the source is typically an airgun array.

As the waves radiate downward through the Earth's subsurface, they reflect and propagate upwards towards the surface whenever the subsurface medium changes. The upward reflections are detected by a number of receivers and the reflected data recorded and processed in order to image the subsurface. Interpretation of these acoustic images of the subsurface formation leads to the structural description of the subsurface geological features, such as faults, salt domes, anticlines, or other features indicative of hydrocarbon traps.

While two dimensional ("2D") seismic surveys have been conducted since the 1920's, three dimensional ("3D") seismic surveys have only recently become widely used. 3D surveys more accurately reflect the subsurface positions of the hydrocarbon traps, but are expensive and time consuming to acquire and process. For an offshore 3D data set covering a 20×20 km area, it costs about $3 M dollars (1991 dollars) to acquire the data with another $1 M dollars for data processing to transform the raw data into usable images. Because the cost of such a seismic survey is considerably less than the cost of drilling an offshore oil well, 3D seismic surveys are often worth the investment.

One common type of seismic survey is a marine survey, performed by boats in offshore waters. To record seismic data, a boat tows airguns (seismic sources) near its stern, and an up to 5 km long "streamer" containing hydrophones (seismic receivers) along its length. As the boat sails forward, it fires one source and receives a series of echoes into each seismic receiver. For each source-receiver pair, one prestack seismic trace is created. Each trace records sound waves that echo from abrupt acoustic impedance changes in rock beneath the ocean floor. Also recorded in a prestack trace, in a header section of the trace record, is information about the location of the source and receiver [Barry, Cavers, and Kneale, 1975]. Prestack traces are not associated with any particular area of the survey. Each echo that appears in a prestack trace is caused by a reflector that lies somewhere along, and tangent to, an elliptical path whose foci are the seismic source and receiver.

The spatial relationship between sources and receivers in a land seismic acquisition scenario differs from that described above; however, the present invention is unaffected by this.

A seismic survey is performed over a bounded region of the earth. This region is generally, but not necessarily precisely, rectangular. The survey area is partitioned into an array of bins. "Binning" is the assignment of traces to a survey array—usually a 12.5 by 25 meter rectangle. Any particular bin is located by its Cartesian coordinates in this array (i.e., by its row and column number). The ultimate output of the seismic survey is data that shows the location and strength of seismic reflectors in each bin, as a function of depth or time. This information cannot be deduced directly, but rather must be computed by applying numerous data processing steps to data recorded.

Although 3D marine surveys vary widely in size (1,000 to 100,000 km$^2$), a typical marine survey might generate in excess of 40,000 data acquisition tapes. Data is accumulated at a staggering rate, about 1.5 million data samples every 10 seconds. A significant amount of time and money is spent in processing this enormous amount of data. The result of the seismic survey is thus an enormous amount of raw data indicative of reflected signals which are a function of travel time, propagation, and reflection effects. The goal is to present the reflected amplitudes as a function of lateral position and depth.

A typical marine seismic survey goes through three distinct sequential stages—data acquisition, data processing, and data interpretation. Data processing is by far the most time consuming process of the three. The acquisition time for a medium to large 3D marine seismic survey is in the order of two months. In addition to seismic data, navigation information is also recorded for accurate positioning of the sources and receivers. The resulting digital data must be rendered suitable for interpretation purposes by processing the data at an onshore processing center. The processing sequence can be divided into the following five processing steps.

1. Quality Control, filtering and deconvolution. This processing is applied on a trace basis to filter noise, sharpen the recorded response, suppress multiple echoes, and generally improve the signal-to-noise ratio. Most of these signal processing operations can be highly vectorized.

2. Velocity analyses for migration. This processing estimates the velocity of the subsurface formations from the recorded data by modeling the propagation of acoustic waves with estimated velocities and checking for signal coherence in the acquired data. It is similar to migration but is applied to a small section of the data cube.

3. 3D dip moveout correction and stacking. This processing step, generally the most input/output intensive part of the processing, (i) sums together several traces in order to eliminate redundancy and increase the signal-to-noise ratio, (ii) corrects for time delays that occur when the reflected signal is recorded by successive hydrophones that are located increasingly farther away from the energy source, and (iii) positions and orients the stacked data in accordance with the navigation information. After this processing step, the data is referred to as stacked data. This step normally constitutes on the order of a 100 to 1 reduction in data volume. Migration. This processing step, computationally the most intensive, relocates the position of reflected strata, that are recorded in time, to their correct position in depth.

5. Enhancement and filtering. This processing step is used to enhance the migrated data using digital filtering techniques.

The stacking process (step 3) reduces the amount of data to what is essentially a three dimensional array of numbers (i.e. a data cube) representing amplitudes of reflected seismic waves recorded over a period of time (usually 8 seconds). Such data cubes can be large, for example, a medium size 3D survey may produce cubes as large as 1000×1000×2000 of floating-point numbers.

The stacked data cube represents a surface recording of acoustic echoes returned from the earth interior and is not usually directly interpretable. The migration (or acoustic imaging process, step 4) is used to convert stacked data into an image or a map which can then be viewed as a true depth map cut out of the survey area.

Thus, migration is one of the most critical and most time consuming components in seismic processing is migration. Generally speaking, migration transforms the seismic data recorded as a function of time into data positioned as a function of depth fusing preliminary knowledge of the propagation velocities of the subsurface. In particular, migration moves dipping reflectors to their true subsurface position. Migration is typically performed on post stack seismic data to reduce the amount of processing time, but even so takes weeks of conventional supercomputer time for even medium size post stack seismic data cubes.

Many types of stacking and migration processes are well known. See, O. Yilmaz. 1987. *Seismic Data Processing*. Tulsa, Okla.: Society of Exploration Geophysicists. Usually, one poststack trace is associated with each bin. However, it is also possible to create multiple poststack traces per bin. For example, each such trace might contain contributions from prestack traces whose source-receiver separation falls within a specific range. (In this case, the bin is said to contain a common depth-point or common midpoint gather.)

Stacking programs create poststack data from prestack data by simple manipulation of prestack data. In general, a stacking program transforms each prestack trace exactly once. Migration programs create poststack data from prestack data by more complicated, computationally intensive, manipulation of the same data. Migration programs transform each prestack trace a large number of times, requiring commensurately more computation than simpler stacking programs. Multiple prestack traces are transformed and added together and superimposed to create the one or more poststack traces associated with a bin.

One common approach to implementing migration computations is the Kirchhoff method. See, U.S. Pat. No. 5,198,979 Moorhead et al. See also, S. Deregowski and F. Rocca, 1981. Geometrical optics and wave theory for constant-offset sections in layered media. *Geophysical Prospecting*, 29, 374–387. Using the Kirchhoff approach to implement 3D Dip Moveout ("DMO"), a program transforms a prestack trace once for each bin that lies under a line drawn between the seismic source and receiver. This line is referred to as the "coverage" of the trace. Each transformed prestack trace is added, sample-by-sample, to incrementally create one or more the poststack traces in each bin. The signal-to-noise ratio of each poststack trace increases as the square root of the number of transformed prestack traces added together to form it.

The Kirchhoff approach is computationally expensive. Approximately 30 arithmetic operations (floating-point operations, or FLOPs) are required for each sample of each transformed trace in DMO. Given an average shot-receiver separation of 3 kilometers, a bin width of 12.5 meters, and 8 seconds worth of data in each trace acquired at 4ms/sample, this implies an average of approximately 10 million FLOPs per trace. A typical 20 km square marine survey using 12.5 meter wide, 25 meter tall bins contains perhaps 80 million prestack traces. The DMO process thus consumes approximately 800 trillion FLOPs. This computational expense motivates the implementation of migration programs such as DMO on some form of high-performance supercomputer, such as a massively parallel processor. See, Thinking Machines Corporation, 1993. *The Connection Machine CM-5 Technical Summary*. Such a processor is an attractive platform upon which to execute migration programs, because its performance scales up as its size increases; thus, the system can grow incrementally as the computational demand of the processing organization increases. See also, W. Daniel Hillis and Lewis W. Tucker, The CM-5 Connection Machine: A scalable supercomputer, *Communications of the ACM*, November 1993, Vol. 36, No. 11, pp 31–40.

Parallel Computation

FIG. 1 is an example of a multiprocessor parallel computer, specifically a massively parallel processor (MPP) such as the CM-5. In FIG. 1, an MPP 10 consists of 3 major components: (i) a disk storage system 12 whose capacity and data transfer rate can be scaled up as storage and data throughput requirements demand, (ii) a data and control communications network 14 that ties together the processors and the disk storage system, and (iii) a set of processing nodes 16 (see FIG. 2), each containing at least one processor 18, memory 20, and interface 22 to the data and control network 14. The capacity of the data network 14 (the amount of data it can transport in a given amount of time) scales as the number of nodes 16 increases. The size of the set of processing nodes 16 can be scaled up as computational requirements demand. On an MPP, processor nodes 16 can execute independently from one another; however, the control portion of the data and control communications network 14 provides a means by which all nodes 16 can synchronize their activities.

An MPP can improve the performance of computationally-intensive migration programs because it is possible to partition the work to be done and assign a part of it to each processor node 16. For this approach to scale as the size of the MPP 10 scales, the work partitions must be truly independent of one another, such that no two processors share work. This is an expression of Amdahl's Law, which states that the maximum parallelization speedup possible is the inverse of the fraction of time an application spends performing serial computation. See, G. Fox et al., 1988. *Solving Problems on Concurrent Processors*, Vol. 1, page 57.

For example, in seismic migration processing, each bin in the survey area must be assigned to one and only one processor at any one time. Any attempt to assign the same bin to more than a single processor would require a serializing synchronization to guarantee proper results. Because DMO moves a large amount of data, the means by which data is moved between the disk storage system 12 and the memories 20 of the processing nodes 16 is especially important. In order to avoid implications of Amdahl's Law, the data must be moved in parallel as efficiently as possible. One type of disk storage system that satisfies this requirement is a RAID disk system. See, S. J. Lo Verso, M. Isman, A. Nanopoulos, W. Nesheim, E. D. Milne, and R. Wheeler. SFS: A parallel file system for the CM-5. In *Proceedings of the* 1993 Usenix Conference.

Another implication of Amdahl's Law is that the work partitions must be designed so that all nodes are required to perform equal amounts of computation. This latter requirement is referred to as load balancing.

Kirchhoff DMO on a Multiprocessor

A scalable means to implement DMO on a multiprocessor computer is to: (i) load a set of prestack traces from the disk storage system 12 into the processing nodes 16, (ii) determine which bins in the survey area are covered by the union of all of the loaded traces, (iii) assign to each node 16 a portion of the survey area covered by the loaded traces, (iv) load from the disk system 12 into the appropriate nodes 16 the poststack traces from the covered bins, (v) apply the DMO operator to each loaded prestack trace in each processor to update the poststack traces, and (vi) write out the updated poststack traces from the nodes 16 to the disk system 12. U.S. patent application Ser. No. 08/160,123 filed Dec. 1, 1993 describes a method for inputting seismic data for processing on a multiprocessor computer.

The assignment of portions of the survey area to the nodes 16 must be non-overlapping. This satisfies the independence requirement for scalability on an MPP because each bin is independent of other bins. This also permits a disk I/O strategy that allows the poststack traces to be read from and written to the disk storage system 12 in parallel. This is important, because each poststack trace will typically be read in, updated, and written out many times during the processing of a prestack data set. Thus, the organization of the file on the disk storage system containing the poststack data and the strategy with which the data is read and written can strongly impact the efficiency of the DMO process.

However, a simple non-overlapping partitioning of bins does not in itself guarantee good performance. For example, if each node is a priori assigned the same number of bins to process, this approach will not in general achieve good load balancing. This is especially true when marine seismic data is being processed, due to the geometry with which the data is acquired.

FIG. 3 depicts a typical configuration of seismic sources and receivers in a marine seismic survey. A seismic acquisition vessel 30 sails forward towing a streamer cable 32 containing multiple seismic receivers 36 located at different points along the cable. Near the stern of the vessel is a pair of airguns 34, which are the seismic sources. With each firing of an airgun, a collection of prestack seismic traces are recorded, one-trace from each receiver 36. For each trace and each bin 38 under the coverage of the, the DMO operator transforms the trace and adds it to the poststack trace associated with the bin. Since the stream cable 32 follows in a nearly perfect straight line behind the vessel 30 parallel to the direction the vessel is sailing, the bins closest to the airguns 34 (called "near offset" bins) and under the streamer cable will be in the coverage of more traces than the bins closest to the last receiver 36 on the cable (called "far offset" bins).

The ratio of traces covering a so-called "near offset" bin to those covering a "far offset" bin will be equal to the number of uniquely located receivers 36 on the streamer cable. Typically, there are between 120 and 240 receivers on a cable. This means that a processor node 16 assigned to process a near-offset bin will have perhaps 240 times more work to do than a node assigned to a far-offset bin.

The preceding discussion considered only the processing of a single shot record (the set of traces recorded by all of the receivers from a single shot of an airgun). The load imbalance problem is further exacerbated when multiple shots are processed simultaneously, as is typically done when executing DMO on a multiprocessor computer. To see why this is so, consider that the acquisition vessel sails forward a short distance (typically 25 meters) between shots. As a result, the number of traces covering bins near the near-offset bin of the first shot in a set of shots is multiplied roughly by the size of this set; however, the coverage of the first far-offset bin is unchanged, since the receiver at the end of the streamer cable has now been towed beyond the bin.

A similar load imbalance will exist when processing land seismic data, which is typically sorted into collections of prestack traces associated with each receiver point in the survey. The corresponding shot points are located in all directions and at various distances from the receiver, causing the trace coverage of bins near the receiver to be higher than those farther from the receiver. If sets of traces from multiple receivers are processed simultaneously, and if the receivers in the set are located near one another, the severity load imbalance problem will increase, as it does when multiple marine shot gathers are processed.

In this application, all references to patents are incorporated by reference and all other references are incorporated by reference for background.

SUMMARY OF THE INVENTION

The method of the present invention allows the computational workload of a seismic process, such as DMO processing to be partitioned unequally and dynamically over multiple processors in a multiprocessor computer to achieve good load balancing.

The invention provides a method for determining how many bins to assign to each processing node of a multiprocessor computer to process a given collection of prestack trace data while achieving good load balancing. The invention also provides a method for efficiently reading different amounts of poststack data from the disk storage system of a multiprocessor computer into different processing nodes of a multiprocessor computer, applying a seismic operator to the data, and then writing the updated poststack data back to the disk storage system.

In the preferred embodiment of the invention, DMO processing is performed on an MPP with a variable number of processing nodes and disks. The preferred configuration of the disk storage system allows a large contiguous block of data to be transferred between disk and processor node memory in an efficient manner. During a read operation, the data block is partitioned into non-overlapping data subblocks of potentially different sizes, and each data subblock is transferred into a processor node's memory. The first subblock is transferred into the first node's memory, the second subblock is transferred into the second node's memory, and so on. A write operation is the inverse of a read operation. A collection of data subblocks are transferred from node memories, and are effectively concatenated together to form a large contiguous data block. This large data block is then written to the disk storage system. In a read or a write operation the size of any subblock can be zero, which allows any node to be skipped.

In the preferred embodiment of the invention, prestack trace data is read from the disk storage system in successive contiguous blocks to respective node memory in conformance with the most efficient mode of operation of the disk storage system. This data may be read into all or some of the nodes of the MPP. Once this data has been read, the nodes holding the data (so-called "input nodes") determine the number of traces covering each bin in the survey, or preferably of a rectangular bin area. A bin area is composed of one or more contiguous bins in the survey, where the area size is a user-specifiable number of rows and columns. The nodes then broadcast a description of this coverage information to all other nodes in the MPP. Note that since each input node reads in a different set of prestack traces, the coverage descriptions that these input nodes broadcast are not identical.

Each node that will apply the DMO operator (so-called "operator nodes") to prestack data coalesces the information in each broadcast into a single description that reflects the total coverage of survey bins by all input nodes. From this information, the operator nodes determine how to best partition the area of the survey containing covered bins into contiguous blocks of bins, and then how best to partition each block into contiguous subblocks of bins. To achieve good load balancing, each block of bins should be partitioned into subblocks composed of bin areas, such that there are as many subblocks as there are operator nodes, and such that the total trace coverage in each subblock of bins is as close to equal as possible.

In the preferred embodiment of the invention, each block into which the covered bins of the survey are partitioned is composed of a number of horizontally-adjoining bin areas. Each subblock into which these blocks are in turn partitioned is therefore also a number of horizontally-adjoined bin areas.

Thus, operator nodes assigned to an area of the survey in which the coverage is low—for example, an area covered only by far-offset traces—will be assigned more bin areas than operator nodes assigned to an area in which the coverage is high—for example, an area covered by near-offset traces. The smallest assignment containing any bins is a single bin area. The largest assignment is limited only by the amount of memory available on an operator node.

Once the bin area assignments have been determined, the operator nodes load the poststack trace data corresponding to their assigned bins from the poststack data file into their memories. In the preferred embodiment of the invention, the data file containing the poststack traces resides on the disk storage system of the MPP. In order to load this data efficiently, it must be possible to load a single block containing the poststack trace data needed by all of the operator nodes, partition it into contiguous subblocks of potentially varying sizes, and load each subblock into the appropriate operator node.

This is possible if the data in the file is organized as follows. The survey area is assumed to be a rectangle containing a number of rows and columns of bins. The area is decomposed into a number of smaller areas, each smaller area being the width of the survey but only the height of a previously described bin area. Within each smaller area, the first column precedes the second column, which precedes the third column, and so on for the width of the survey. Within each column, data for the first row precedes data from the second row, which precedes data from the third row, and so on, for the height a bin area. This arrangement makes it possible to read into any node a contiguous block of data formed from any number of contiguous bin areas. It is thus possible to read a contiguous block of bin areas into any number of operator nodes, partitioning the block into contiguous subblocks of zero or more bin areas.

Once the poststack data has been loaded into the memories of the operator nodes, the operator nodes can retrieve the prestack data from the input nodes that hold it, in accordance with the coverage description broadcast from each input node. An operator node only retrieves prestack traces from an input node that holds traces that cover the operator node's assigned bin areas. While some operator nodes have been assigned more bin areas (and hence, more bins) than others, the total number of traces to be processed by each operator node should be as uniform as possible. As a result, each operator node should finish retrieving and processing its prestack traces at about the same time.

When all operator nodes are thus finished, they write their updated poststack trace information back to the poststack trace data file, using an inverse operation to that previously described for reading the poststack trace data. The operator nodes then assign themselves to the next contiguous block of bin areas within the covered bins of the survey. When all such blocks have been processed, the input nodes read in the next block of prestack data, and the previously-described process repeats. When no unprocessed prestack data remains, the DMO computation terminates.

DETAILED DESCRIPTION

In the preferred embodiment of the present invention, methods are provided for supplying prestack input data to processing nodes on a massively parallel processor (MPP) for performing seismic migration, such as a "3D Dip Moveout" or "Kirchhoff" migration.

MPP Overview

Figure 1:
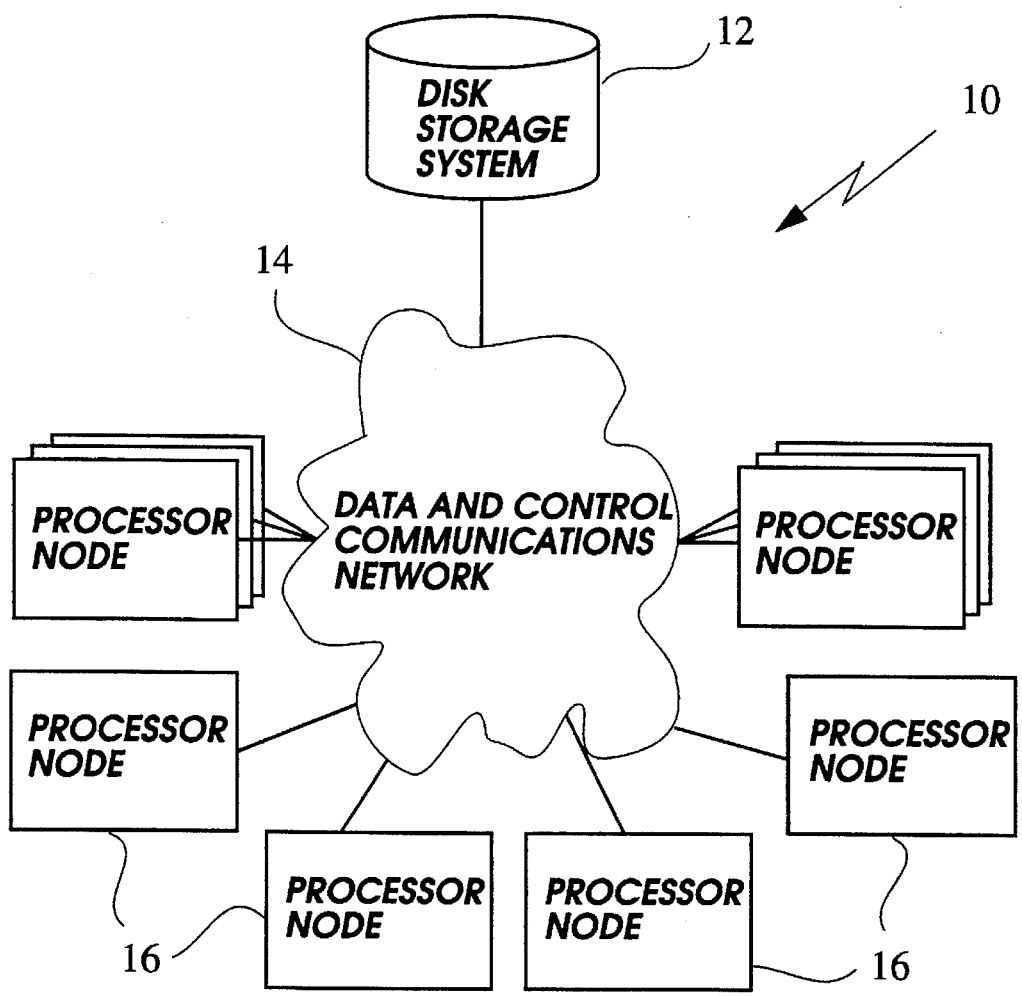
FIG. 1 is a block diagram of the abstract massively parallel processor architecture for performing seismic processing in accordance with the methods of the present invention.
Figure 2:
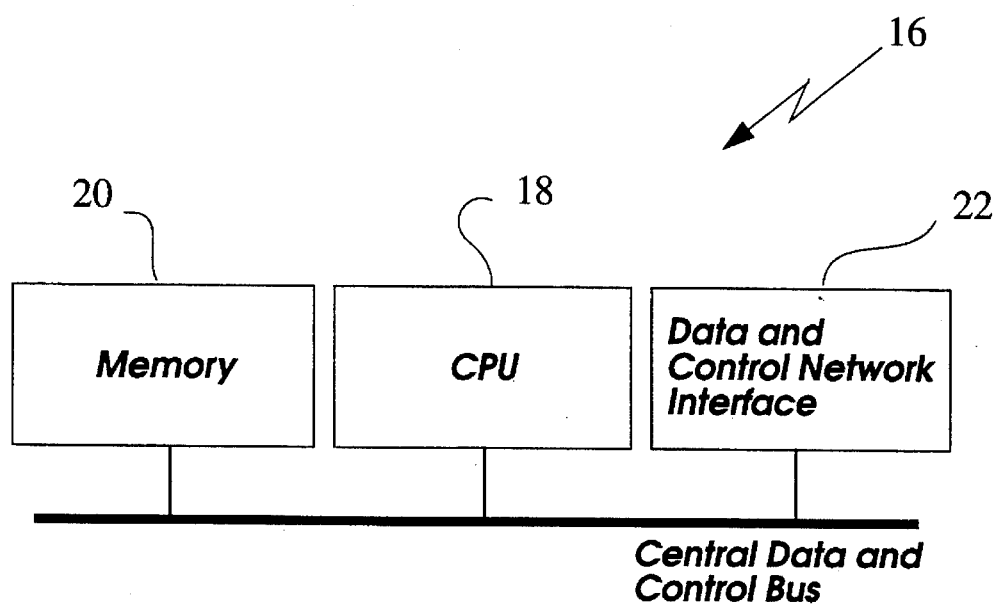
FIG. 2 is a block diagram depicting the abstract architecture of a processor node in an MPP used for performing partial or full migration in accordance with the methods of the present invention.

FIG. 1 depicts an abstract MPP architecture compatible with the methods of the present invention. The exact details of the data and control communications network are unimportant. In accordance with the methods of the present invention, the communications network 14 need only support the exchange of arbitrary messages between any two processor nodes 16, the ability of any one processor node 16 to broadcast an arbitrary message to all other nodes 16, and the ability of all nodes 16 to synchronize their activities when necessary. Under the preferred embodiment of the invention, the data network 14 should support the transfer of at least 5 megabytes of data per second for each node in the MPP 10. For example, an MPP containing 32 nodes should support at least 160 megabytes/second of aggregate data throughput. FIG. 2 depicts an abstract MPP processing node 16 compatible with the methods of the present invention. Once again, the exact details are unimportant. Under the preferred embodiment of the invention, the node should contain at least 16 megabytes of local random access memory 20 (i.e. "local" memory), and be capable of transmitting and receiving data over the interface 22 to the data communications network 14 at a rate of at least 5 megabytes/second. The CPU 18 can in fact comprise a number of processors.

The preferred embodiment of the invention employs an MPP architecture whose performance scales nearly linearly as the number of nodes 16, amount of local memory 20 on each node, and size of the disk storage system 12 (i.e. "remote" memory) are increased commensurately. This requires the throughput of the data and control network 14 to scale linearly with the number of processors, since more processors will exchange more data using the network 14. It further requires the throughput of the disk storage system 12 to scale with the number of processors, since more processors will attempt to read more data at the same data rate. By implication, this also requires the capacity of the disk storage system 12 to scale with the number of processors.

A disk storage system architecture that meets this requirement is a disk array, sometimes called a "RAID" architecture, in which a number of usually inexpensive disks are made to appear as a single file system. See, S. J. Lo Verso, M. Isman, A. Nanopoulos, W. Nesheim, E. D. Milne, and R. Wheeler. SFS: A parallel file system for the CM-5. In *Proceedings of the 1993 Usenix Conference*. Employing a RAID architecture is in itself insufficient to guarantee scalability. The disk storage system must be used in a scalable manner. In general, this requires disk read and write operations to be both synchronized in time and localized over the disk surface, such that each disk is reading or writing from the same place at the same time.

One such MPP that satisfies these requirements is the Connection Machine model CM-5, manufactured by Thinking Machines Corporation of Cambridge, Mass., employing a DataVault or Scalable Disk Array as a disk storage system 12. The I/O system allows any group of nodes 16 to read a block of data from the disk storage system 12, or write a block of data to the disk storage system 12, subject to the constraint that the data block represents a contiguous subset of a file. The block is read into or written from the memories of the group of nodes. The first part of the block is read into or written from the first node in the group; the second part of the block is read into or written from the second node in the group (if there is one). Each succeeding part of the block is read into or written from each succeeding node in the group through the last node in the group.

It should be understood that other multiprocessor computer architectures and other disk storage system architectures that either require or allow a contiguous block of data to be read into or written from a group of nodes 12 of a multiprocessor computer can also be employed by the methods of the present invention.

Figure 3:
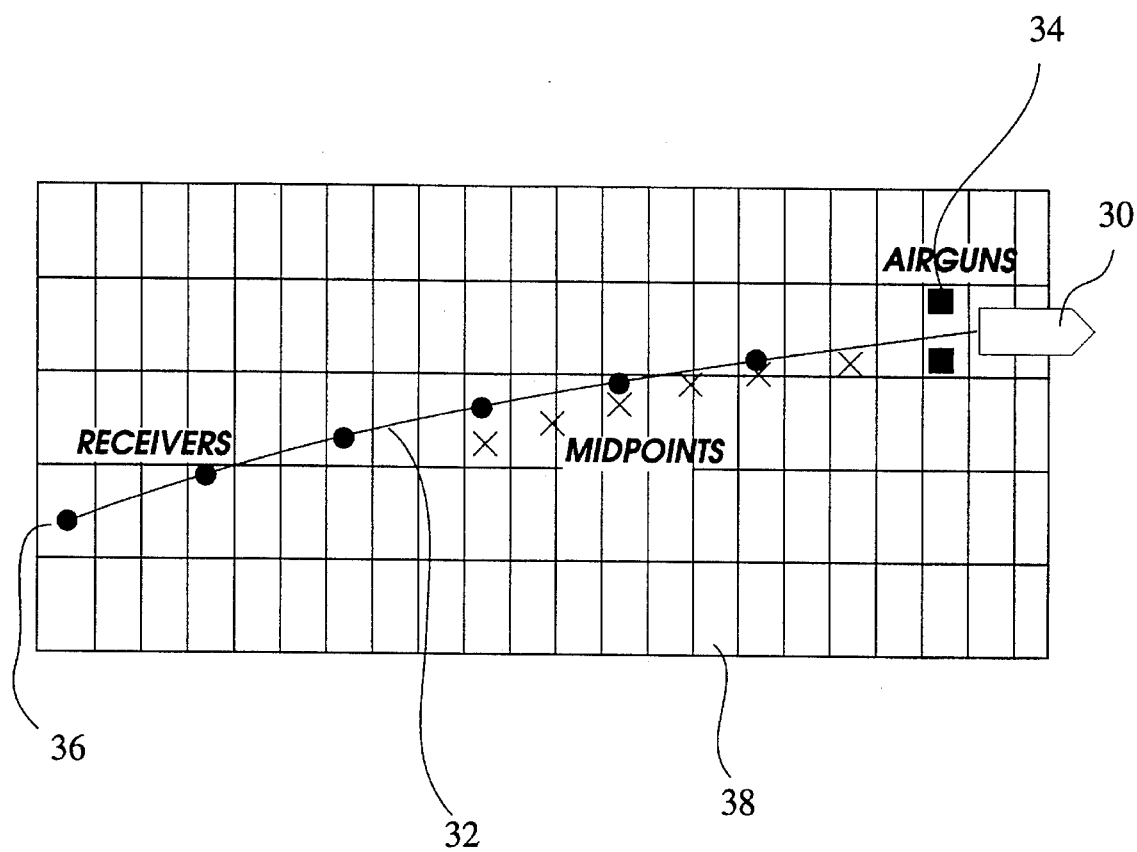
FIG. 3 is a simplified depiction of marine seismic data acquisition.
Figure 4:
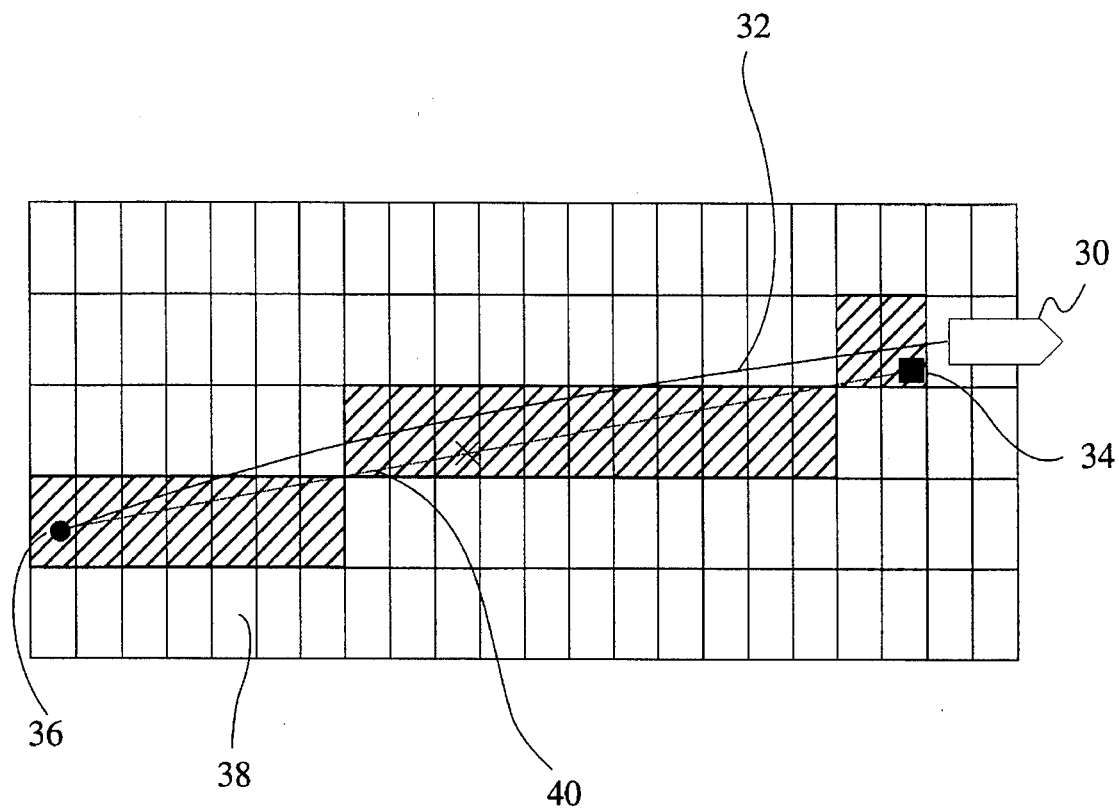
FIG. 4 illustrates the bin coverage of the "far-offset" trace in the survey depicted by FIG. 3.

How Seismic Acquisition Techniques can Create Load Imbalance FIG. 3 shows a simplified 3D marine seismic data acquisition scenario. In actual contemporary practice, a seismic acquisition vessel might tow two streamers 32, which can be up to 5 kilometers in length. Typically a source or airgun array 34 operates in conjunction with a streamer 32 having up to 240 receivers 36 (hydrophones). In addition, survey vessels 30 often operate in pairs, one vessel 30 firing seismic sources 34, and both vessels recording the resulting echoes at the receivers 34. The area over which the seismic survey is conducted is partitioned into bins, as shown in FIG. 3. Each trace recorded during a survey crosses a number of bins 38. During migration, a prestack trace is processed by application of a mathematical operator once for every bin 38 under the trace's "coverage," and superimposed with other traces processed into the same bin. For example, the coverage of a trace in a 3D Dip Moveout program is a line 40 between the seismic source 34 and trailing receiver 36, as depicted in FIG. 4. Thus, in the present application the term "coverage" means an identification of the bins containing seismic data associated with a particular trace. In practice, such a "far offset" trace may cross 400 such bins 38, and an average trace may cross 240 bins. Marine prestack data is usually collected into "common shot gathers" consisting of the traces collected from each receiver on the streamer from a single shot.

Figure 5A:
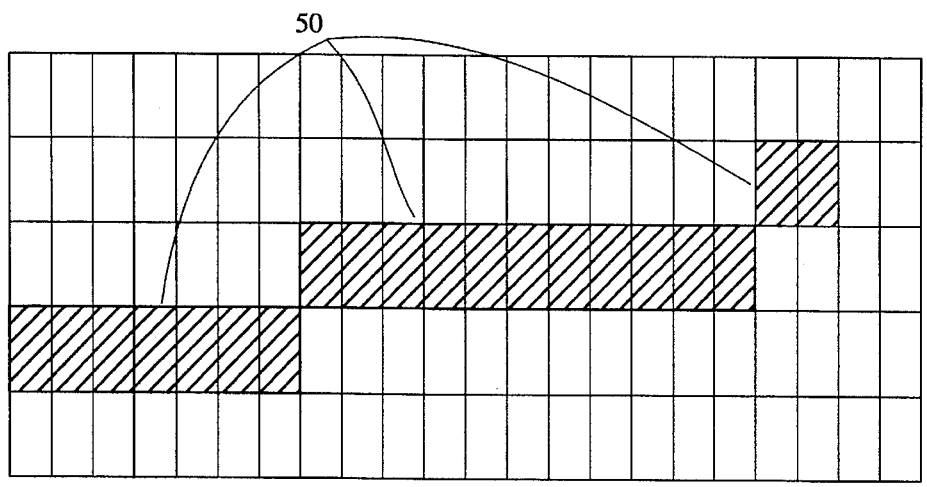
FIG. 5 (a–c) illustrate the operation of computing the union of two trace coverage descriptions.
Figure 5B:
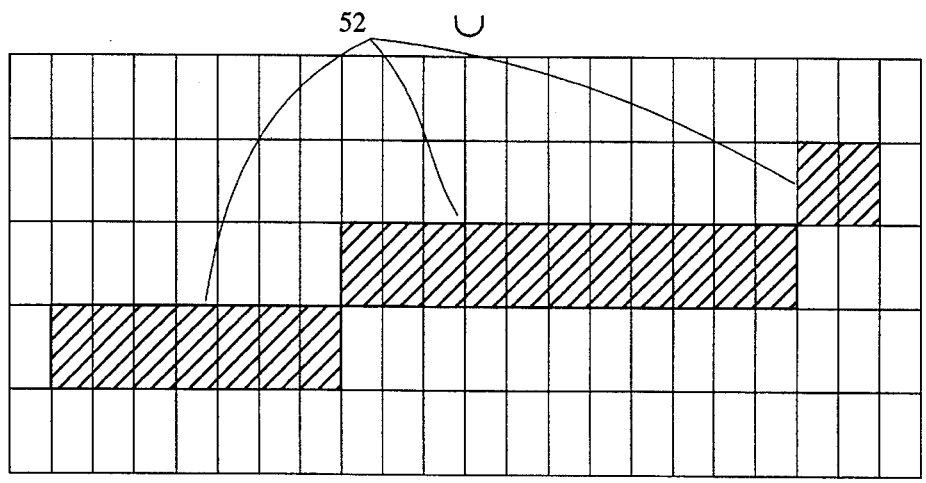
Figure 5C:
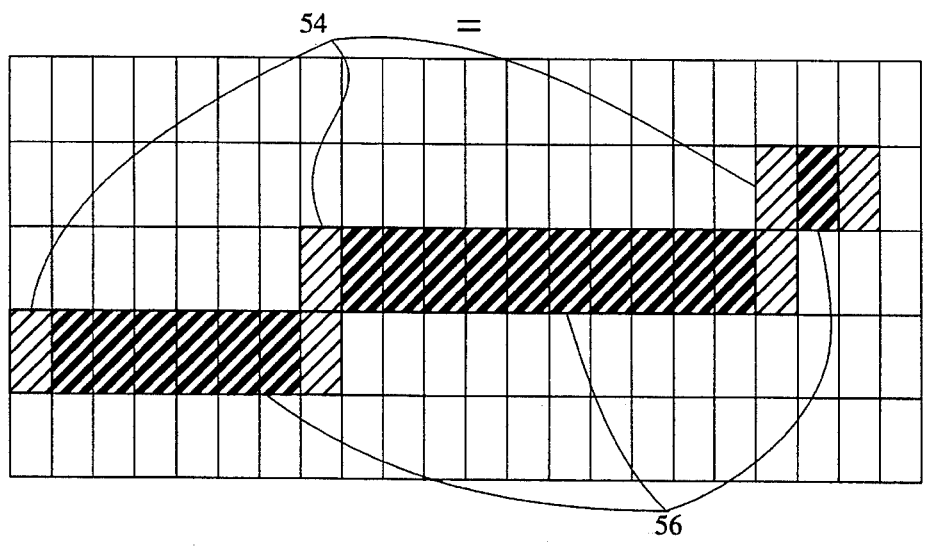
Figure 6:
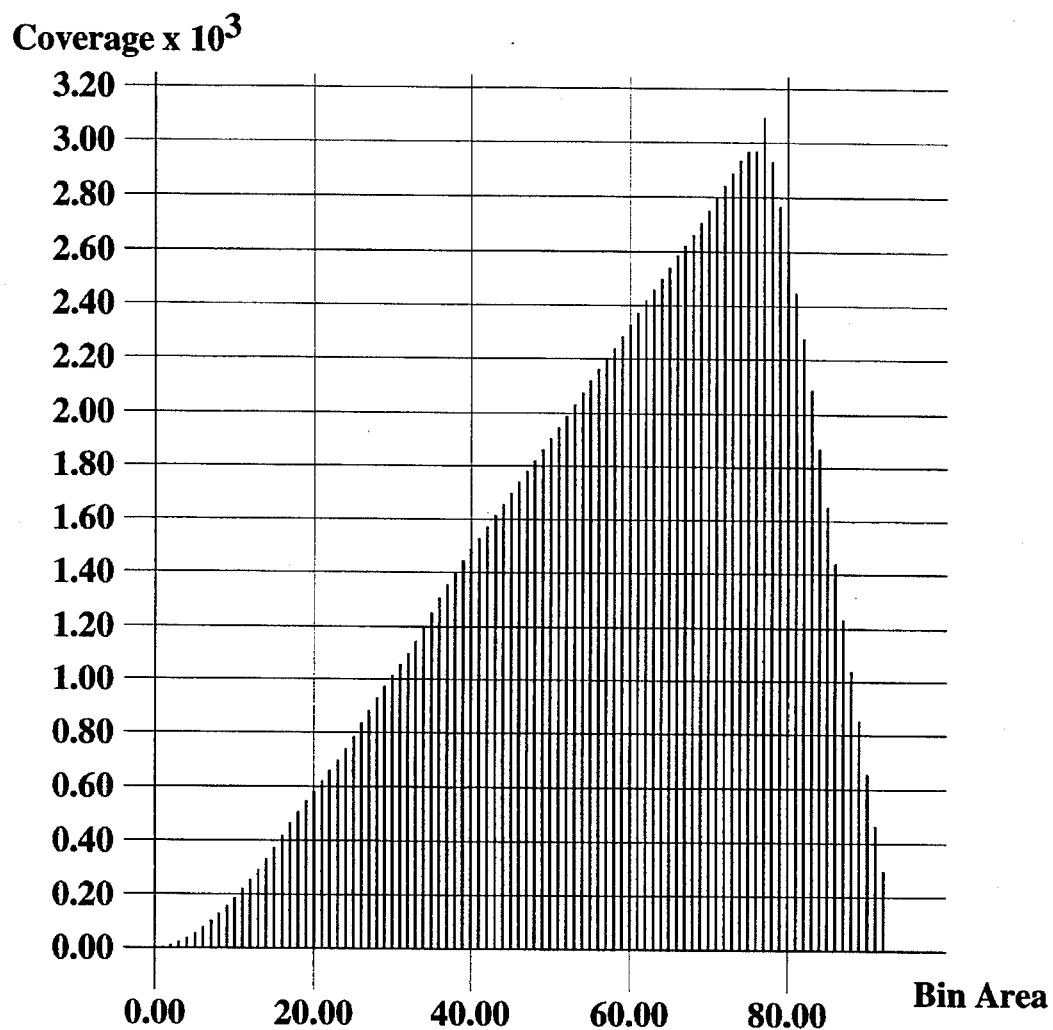
FIG. 6 is a bar graph depicting how the trace coverage for bin areas varies over a large number of columns for marine seismic data.
Figure 7:
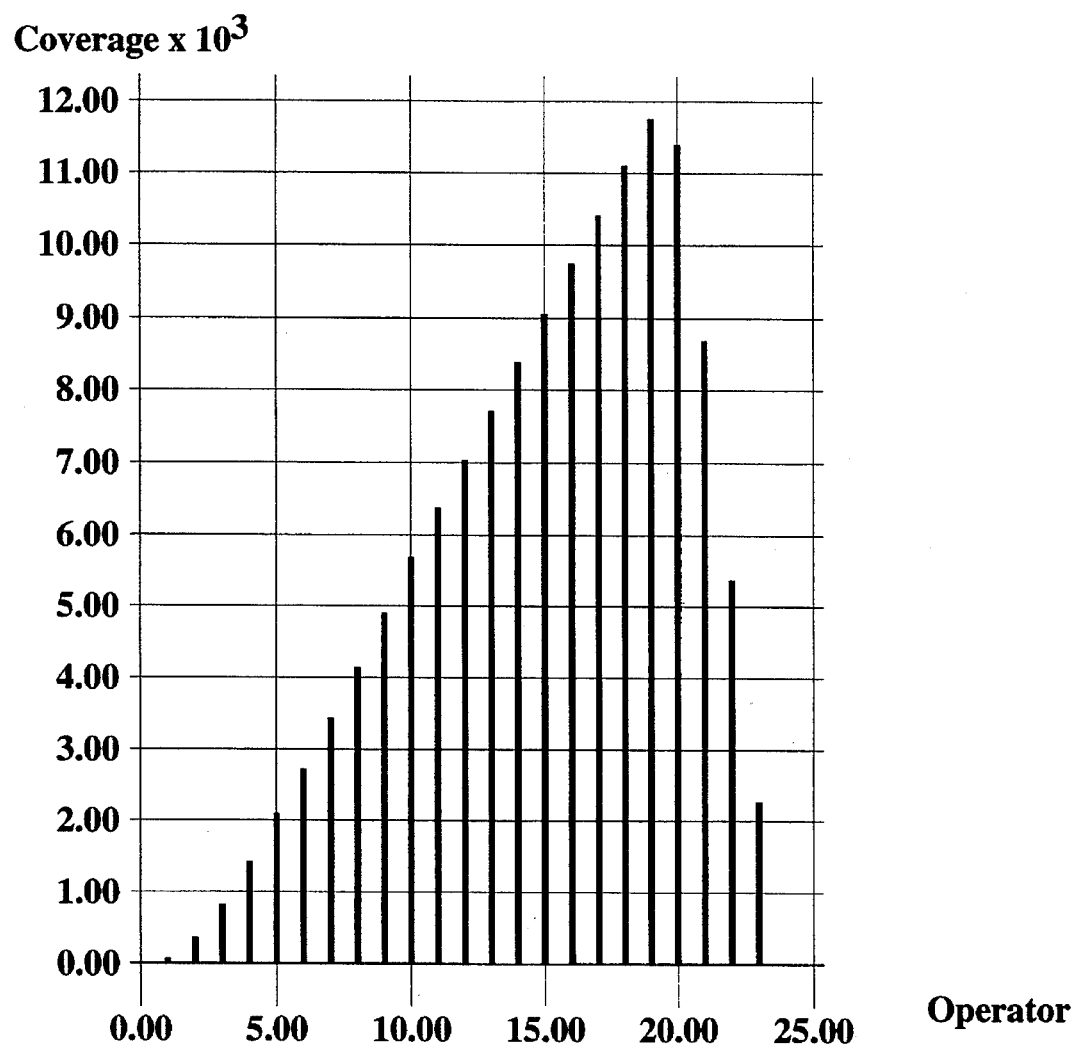
FIG. 7 is a bar graph depicting how a simple, non-load-balancing assignment of bin areas to operators for the coverage data of FIG. 6 would result in greatly varying workloads for different operator nodes.
Figure 8:
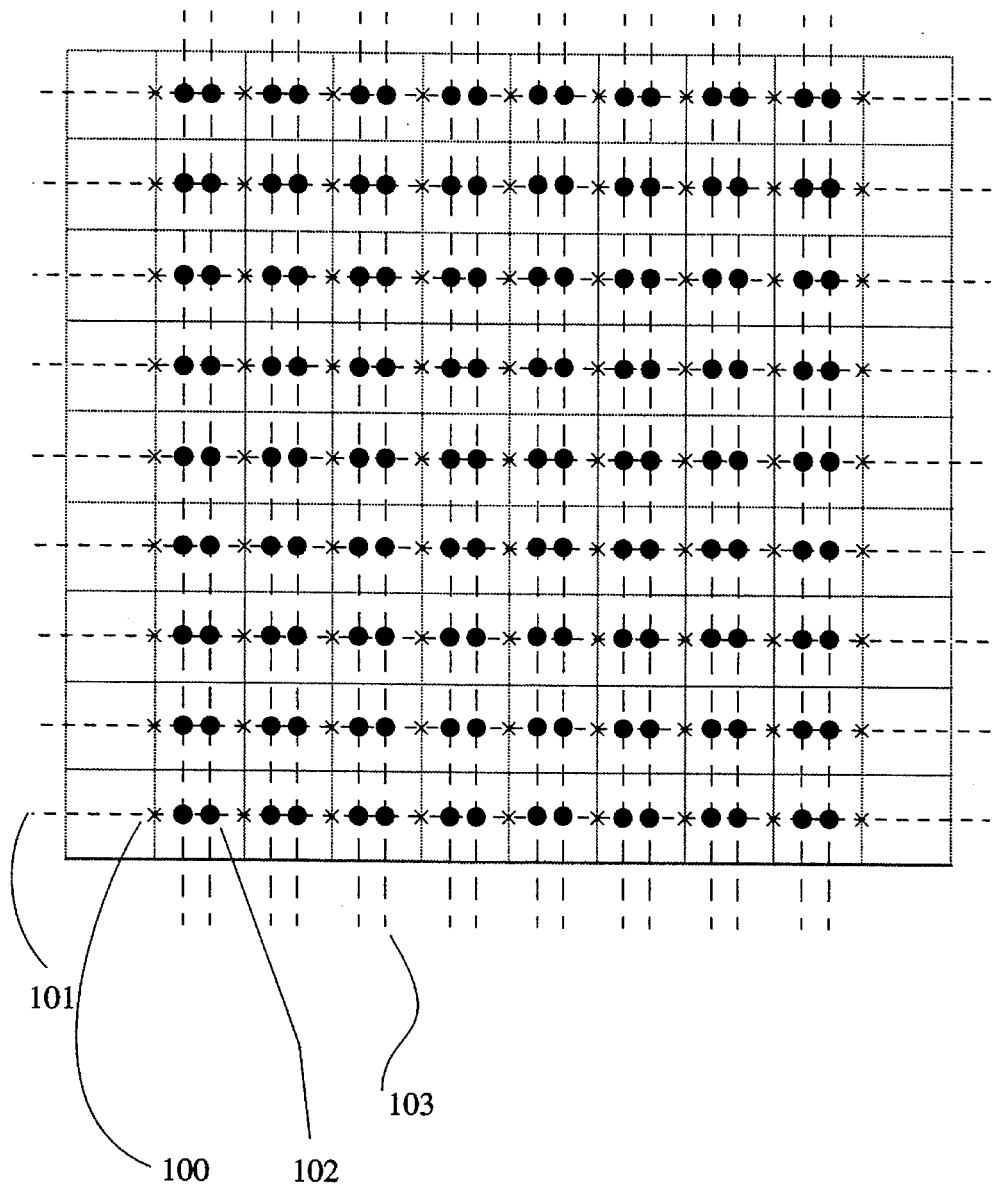
FIG. 8 is a simplified depiction of land seismic data acquisition.

FIG. 5 shows how the coverage from the far-offset traces of two common shot gathers from shots taken in succession combine to create workload imbalance. The first shot coverage 50 (FIG. 5a) combines with the second shot coverage 52 (FIG. 5b) to form the combined coverage 54 (FIG. 5c). In the combined coverage 54, the darker crosshatching 56 depicts those bins that are covered by the far-offset traces of both shots. Because the amount of work to be done when processing a bin depends on the number of traces whose coverage includes the bin, processors assigned to bins with two-trace coverage will have more work to perform than those assigned to bins with single-trace coverage. When more than two shots at a time are considered, and when the streamers contain the typical number of receivers used in actual marine seismic acquisition, and when all of the traces recorded from each streamer are considered, the load imbalance problem can be significant, with some bins covered by more than a few thousand times as many traces as others. FIG. 6 shows the trace coverage of a line of 95 bin areas, each bin area consisting of 4 columns of bins and 8 rows of bins (e.g. 32 bins), using data from an actual marine seismic survey. The streamer contained 144 receivers with a maximum offset (distance from source to receiver) of just over 3 km. The coverage data was generated from 32 common shot gathers. The peak coverage value is 3092 traces in a single bin area, whereas the smallest non-zero value is 2 traces in a single bin area. FIG. 7 shows how many traces each processor of a 24-processor MPP would process if the bin areas of FIG. 6 were assigned respectively to the processors, such that each processor was assigned 4 bin areas (i.e., rectangular areas consisting of 16 columns and 8 rows or 128 bins), except for the last processor, which would be assigned 3 bin areas. The busiest processor would process almost 12,000 traces, whereas the least busy processor would process only 5 traces. The foregoing discussion considered only marine seismic data acquisition. However, load balancing problems are introduced in land seismic data acquisition as well. In land seismic acquisition, multiple parallel lines of receivers receive reflections from shots, which are located along multiple perpendicular parallel lines 101,103 as shown in FIG. 8. The lines form a grid. FIG. 8 depicts an ideal 3D land survey geometry. The shot points 100 are located along horizontal lines 101 and are indicated with X's. The receiver points 102 are located along vertical lines 103 and are indicated with filled circles.

Land prestack data is usually collected into "common receiver gathers" consisting of the traces collected from a single receiver from all of the shots. Since in general a common receiver gather consists of data from shot points located in all directions around, and at various distances from the receiver location, the trace coverage of such a gather tends to be greater in bins nearer the receiver location than those farther from it. Thus, when multiple gathers are combined, there will be bins with substantially higher trace coverage than others if the locations of the receivers in the collection of gathers are close together.

The methods of load balancing of the present invention are capable of handling both marine and land acquisition geometries.

Determining Trace Coverage for Load Balancing

Figure 11:
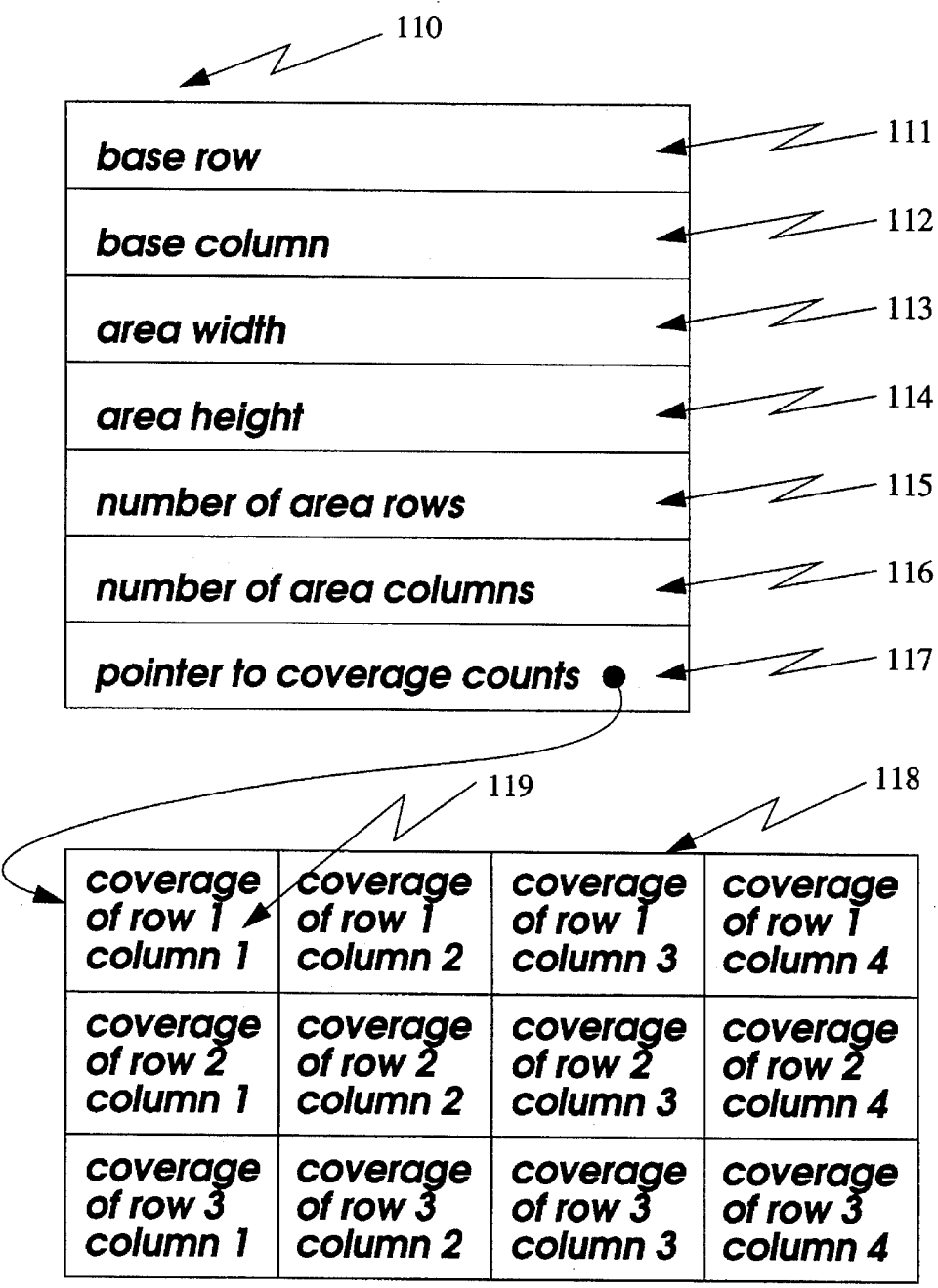
FIG. 11 depicts an in-memory data structure used for determining per-bin-area trace coverage counts in accordance with the methods of the present invention.

In accordance with the methods of the present invention, MPP nodes are designated as input or operator nodes, and the input nodes load a collection of prestack traces. Once this prestack trace data has been read, the input nodes determine the number of traces covering each rectangular bin area. FIG. 11 depicts a coverage map 110 of a data structure compatible with the methods of the present invention in which the input nodes can store coverage information. The preferred means for filling this data structure is as follows:

1. For each trace i each input node has loaded, the node determines the smallest rectangular bounding box, $B_i$, in a Cartesian of the trace. If the migration application is a DMO computation, the coverage is a line drawn between the shot and receiver locations for that trace (see FIG. 4). The shot and receiver location is found in a header section that precedes the data portion of the trace.
2. Each input node unions together each such bounding box $B_i$ to create the smallest o bounding box, $B_L$, that encloses the individual trace bounding boxes.
3. Each input node broadcasts to all other nodes (input and operator nodes) in the MPP a compact description of its bounding box $B_L$ created in step 2. In the preferred embodiment of the present invention, this broadcast consists of the leftmost and rightmost x coordinates of the box, and the topmost and bottommost y coordinates of the box.

Each node that receives such a broadcast unions the described bounding box $B_L$ with a global bounding box description, $B_G$, such that after all broadcasts have received, $B_G$ describes the smallest bounding box that encloses each node's $B_L$.

4. All nodes now have enough information to create a coverage map 110, such as depicted in FIG. 11, to hold trace coverage information for all of the data each input node has loaded. This coverage map is referred to as the "coalesced map."

The base row field 111 of the data structure contains the lower left y coordinate of $B_G$ divided by the height of a bin in the survey, and then rounded down to the next smallest multiple of the bin area height (the number of rows of bins that are grouped together to form a bin area).

The base column field 112 of the data structure contains the lower left x coordinate of $B_G$ divided by the width of a bin in the survey, and then rounded down to the next smallest multiple of the bin area width (the number of columns of bins that are grouped together to form a bin area).

The area width field 113 contains the number of columns of bins that are grouped together to form a bin area. This information may also be encoded in the DMO computation as a constant number, in which case it need not be included in the trace coverage data structure.

The area height field 114 contains the bin area height. This information may also be encoded in the DMO computation as a constant number, in which case it need not be included in the trace coverage data structure.

The number of area rows field 115 contains the bin area width. This information is computed from the height of the bounding box $B_G$, rounded up to the next higher multiple of the bin area height.

The number of area columns field 116 contains the number of columns of bin areas that are described by the data structure. This information is computed from the width of the bounding box $B_G$, rounded up to the next higher multiple of the bin area width.

The pointer to coverage counts field 117 contains a pointer to a 2-dimensional array 118 (FIG. 11) in which the trace coverage counts for individual bin areas will be stored. This array can be allocated once the number of area rows and number of area columns is known, since these two pieces of information determine the height and width of the array. When the array is allocated, it is initialized to contain 0 in each element. The bin area enclosing the base row 111 and base column 112 of the coverage map 110 is the array element 119.

It should be understood that other data structures that allow essentially the same information to be stored are within the scope of the methods of the present invention.

5. Input nodes create a coverage map 110 into which they place trace coverage information for each bin area covered by the union of For each loaded trace, the input node determines which bin areas are crossed by the trace. For each such bin area, the node increments by one the corresponding element in the trace coverage counts array 118 of the coverage map 110.

Figure 12:
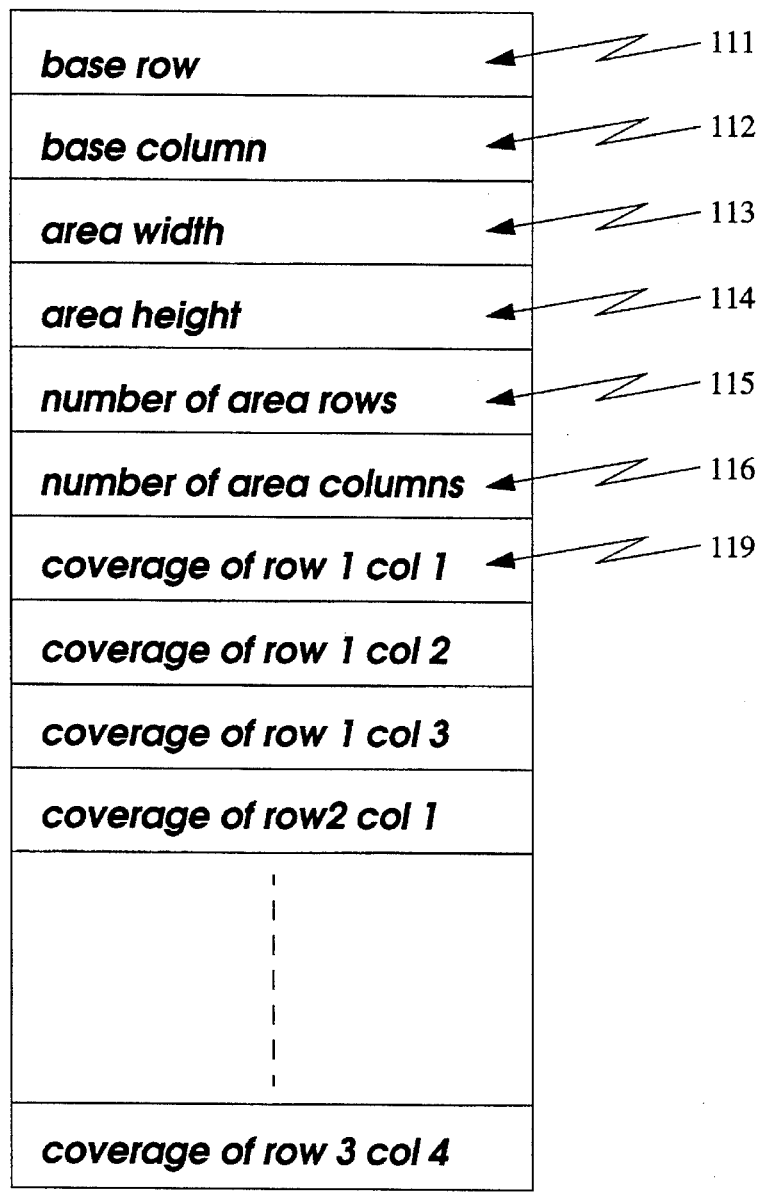
FIG. 12 is a schematic depicting a version of the data structure of FIG. 11 compatible with methods of data transmission over the control and data communications network of the MPP in accordance with the methods of the present invention.

At this point, each input node possesses a coverage map that describes how each trace it has loaded covers the seismic survey. Each node then sends the information in its coverage map to all other nodes in the MPP. Under the preferred embodiment of the invention, this information is sent as follows:

1. Each input node sends two broadcasts. The first broadcast contains the length of the second broadcast. This length is sufficient to include both the fixed size portion of the coverage map and the variable size portion of the coverage map (i.e., the coverage count array). The second broadcast contains the coverage map, rendered in a form that can be sent through the control and data network 14 of the MPP 10 and restored into a machine readable form within each processor node 16. FIG. 12 depicts a broadcast format compatible with the methods of the present invention.
2. When a node receives the first broadcast, it allocates a buffer capable of holding the second broadcast. After the node receives the second broadcast into the buffer, it processes the data in the buffer to recreate a copy of the coverage map data structure 110 sent by the broadcasting node.

3. Each node then adds the information in the received coverage map to its coalesced coverage map. This is done by adding element-by-element the coverage count information in the received coverage map to the coverage count information in the coalesced coverage map.

Bin Allocation for Load Balancing

After each input node has sent its coverage map information, all nodes possess identical coalesced coverage maps that describe trace coverage information for each covered bin area in the survey. From this information, all nodes determine in parallel how to best allocate bin areas to operator nodes subject to optimal load balancing. Each allocation computation is the same and the computation of one node is independent of the computation on other nodes. However, since the data the nodes begin with is identical, and since the allocation computation is identical, each node determines the same allocation of bin areas to operator nodes. Thus, when all nodes have finished the allocation computation, each possesses the same information about bin area allocation.

Many allocation algorithms are possible in accordances with the methods of present invention. The preferred method is as follows:

1. For the first swath of rows that contains covered bin areas, the average bin area coverage value is computed. This is done by summing the coverage counts for each bin area column and dividing by the number of bin areas containing coverage values greater than zero.

2. An initial target coverage value to be assigned to each operator is determined. This target value is simply the average coverage value just computed multiplied by half the maximum number of bin areas each operator node is able to process at any one time.

3. The first operator node is assigned enough bin areas to just exceed the target value. The first bin area assigned is the leftmost bin area in the swath containing covered bins that has yet to be processed. No more bin areas are assigned to the operator node than a previously-specified maximum number of bin areas, and no bin area beyond the rightmost bin area in the swath containing covered bins is assigned.

4. Remaining operator nodes are assigned bin areas as in step 3, except the first bin area assigned is the one to the right of the last bin area assigned to the previous operator node.

Figure 9:
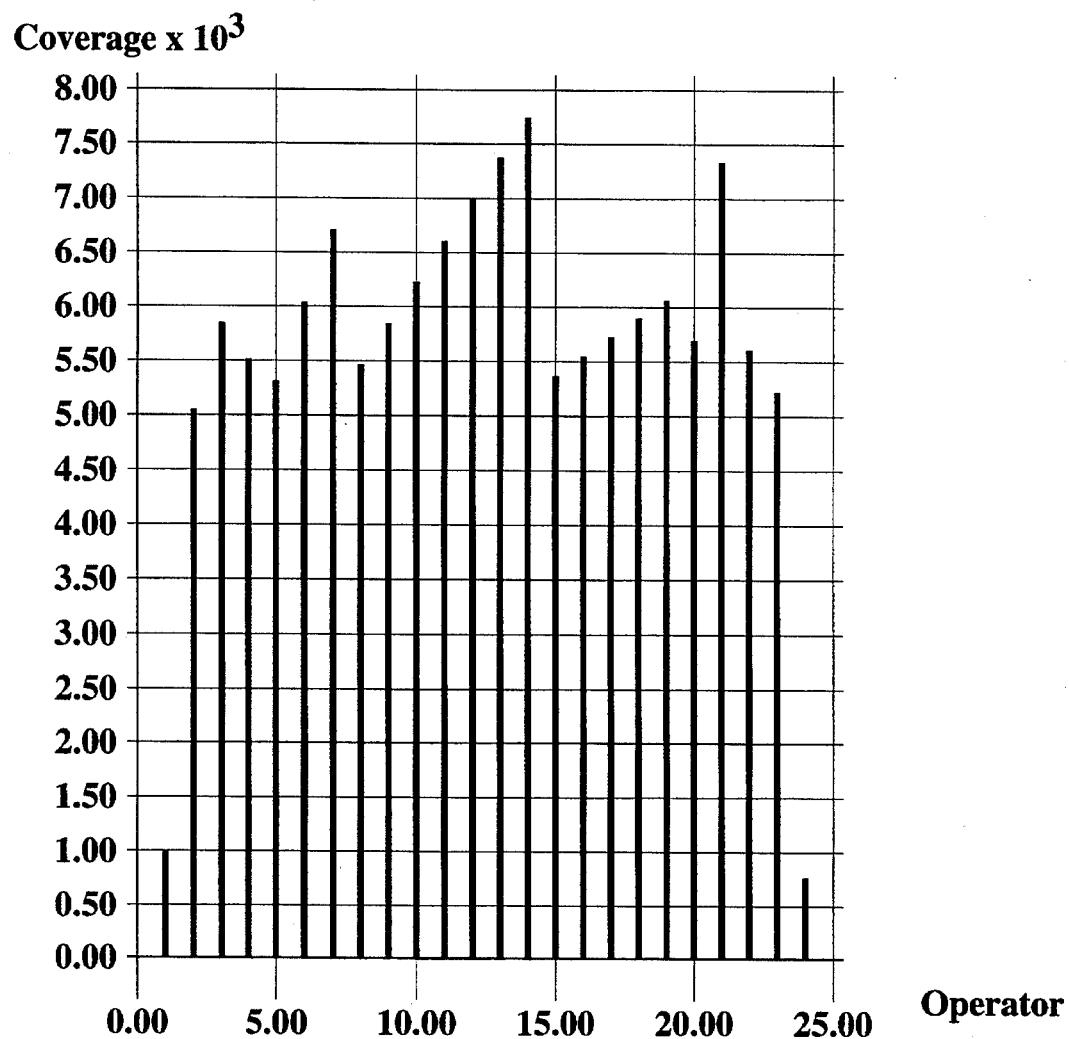
FIG. 9 is a bar graph depicting how the methods of the present invention greatly reduce the variance in workload between different operator nodes for the coverage data of FIG. 6.
Figure 10:
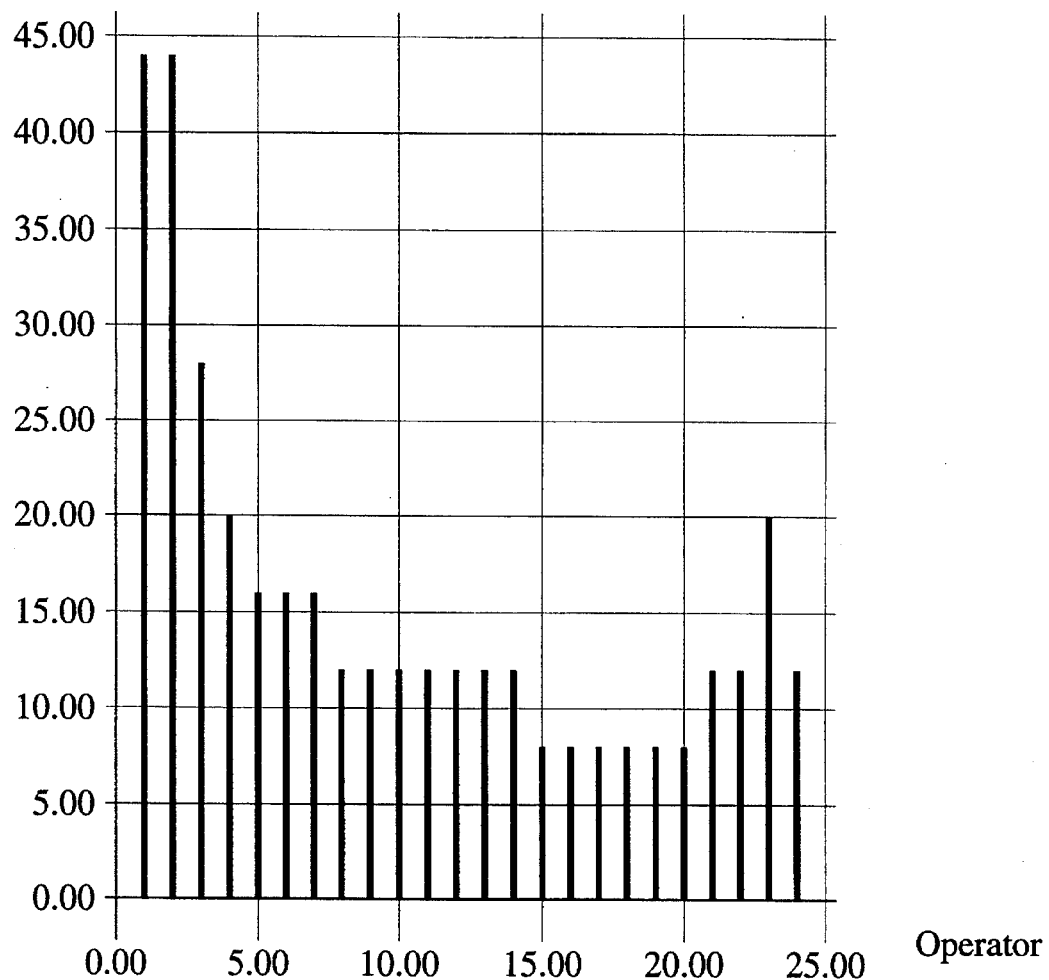
FIG. 10 is a bar graph depicting the number of columns assigned to each operator node using the coverage data depicted in FIG. 6.

FIG. 9 shows how the resulting allocation of bin areas to operator nodes evens out the number of traces to be processed by each operator node, for the coverage data shown in FIG. 6. As compared to FIG. 7, the variance in the number of traces assigned to each node is significantly smaller, as is the maximum number of traces assigned to any single node. FIG. 10 shows how the allocation algorithm assigns a different number of columns to different nodes to achieve this improved load balancing. In this case, the bin area width was 4 columns; thus, each node is assigned a multiple of four columns. The nodes assigned the most columns were assigned 44 columns (11 bin areas), whereas the nodes assigned the least columns were assigned 8(2 bin areas).

Poststack Data Transfer

Figure 13:
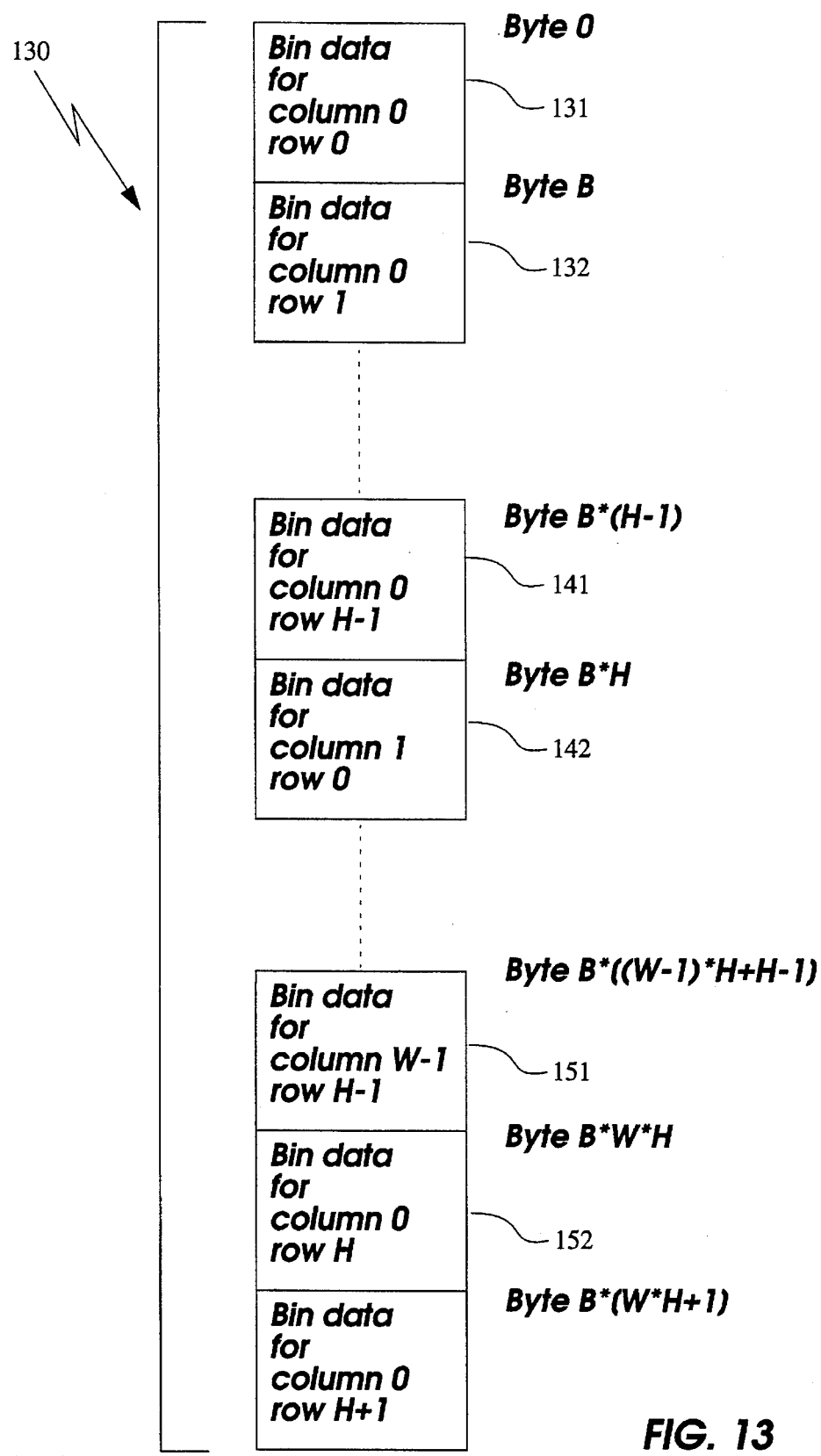
FIG. 13 depicts a data structure showing the organization of a poststack data file in accordance with the methods of the present invention.
Figure 14:
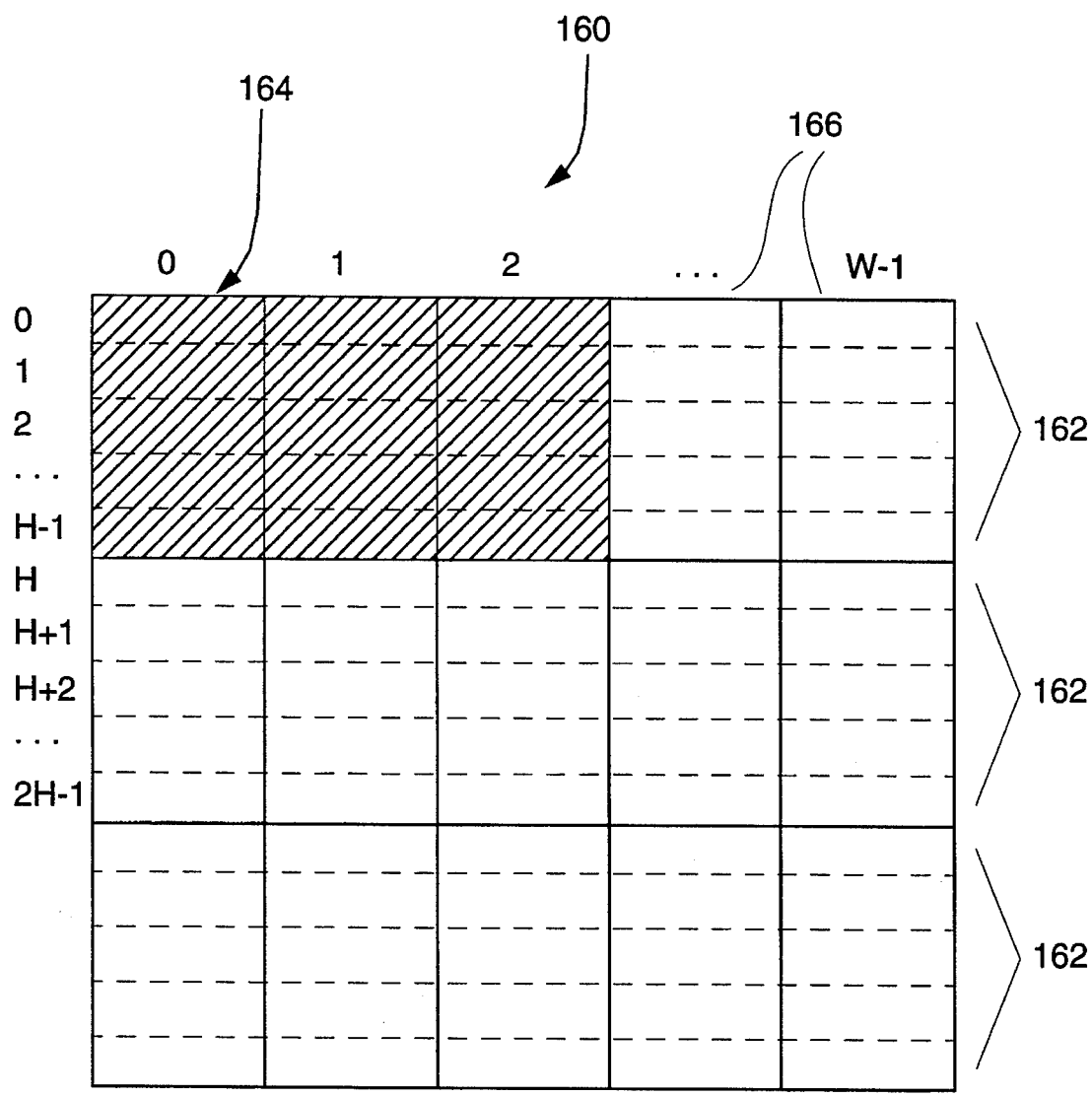
FIG. 14 depicts an example of a survey area for comparison with the data structure of FIG. 13.

Once the bin area assignments have been determined, the operator nodes load the poststack trace data corresponding to their assigned bins from the poststack data file into their memories. In the preferred embodiment of the invention, the data file containing the poststack traces resides on the disk storage system or remote memory 12 of the MPP 10. As has been noted, it must be possible to load this data in a single operation. FIG. 13 depicts a poststack data file organization consistent with the methods of this invention that allows a different number of columns of poststack data to be loaded into different operator nodes in a single input operation from the disk storage system 12. FIG. 14 illustrates an example of a survey area 160 for better understanding the data file organization of FIG. 13.

The survey area 160 covered by the poststack data file 130 is assumed to be a rectangle containing a number of rows and columns of bins 166. The survey area 160 is decomposed into a number of swaths 162, each swath area being the width W of the survey area 160 but only the height H of a bin area. A bin area is one or more contiguous bins, preferably a rectangle, such as denoted by 164 in FIG. 14. Within each swath 162, the first column precedes the second column, which precedes the third column, and so on for the width of the swath. Within each column, data for the first row precedes data from the second row, which precedes data from the third row, and so on, for the height of a bin area.

Thus, in FIG. 13, the poststack data file 130 is composed of a sequence of blocks, each B bytes long. Each block contains the poststack data for a single bin. This data may comprise 1 or more traces. The first block 131 contains poststack data for the bin at column 0 row 0, the bin in the upper left corner of the area covered by the stack file. The second block 132 contains data for the bin at column 0 row 1. Succeeding blocks in the poststack data file 130 contain data for rows 2 through H-1 in column 0, where H is the height of a bin area. The block 141 contains data for column 0 row H-1. The block 142 immediately following block 141 contains data for column 1 row 0. Block 151 contains data for column W-1 row H-1. Block 152, which immediately follows block 15 1 contains data for column 0 row H.

The poststack data file arrangement depicted in FIG. 13 thus allows a group of data blocks comprising any number of columns, starting at any initial column, to be transferred between the local memories 20 of the processor nodes 18 and the poststack data file 130 on the disk storage system 12 in a single large data block in a single input or output operation. The number of rows in a data group transferred into or out of each node 18 must be equal to the height of a bin area, and the first row in a data group to be transferred must be a multiple of the bin area height. The number of columns in a data group to be transferred into or out of each node 18 can be different. While the preferred embodiment contemplates having a fixed number of rows in each data group, an alternative could fix the number of columns and vary the number of rows. Each node transfers c*B*H bytes from the large data block to transfer c columns, where c is the number of bin areas allocated to the node 18 multiplied by the number of columns in a bin area.

Once the poststack data has been loaded into the memories of the operator nodes, the operator nodes can retrieve the prestack data from the input nodes that hold it, and apply the DMO operator to the prestack data to update the poststack data. When all operator nodes are finished processing prestack data that covers their bin assignments, they write their updated poststack trace information back to the poststack trace data file, using an inverse operation to that previously described for reading the poststack trace data.

I claim:

1. A method of assigning prestack seismic input data of a seismic survey comprising an array of bins to processing nodes of a multiprocessor computer having remote and local memory comprising the steps of:

a) dividing the processing nodes into a plurality of input and operator nodes;

b) reading prestack seismic input data from remote memory into the local memory of input nodes;

c) determining the coverage of prestack seismic input data associated with each bin in the seismic survey;

d) broadcasting the coverage to at least the operator processing nodes; and e) assigning bins to operator processing nodes based on the coverage in each bin, the amount of coverage assigned to each processing node being generally equal.

2. The method of claim 1, where for a number of operator nodes including the steps of:

f) each operator node reading poststack seismic data for its assigned bins from remote memory to its local memory;

g) each operator node reading into its local memory its assigned coverage of prestack data from input node local memory;

h) each operator node applying a dip moveout migration operation to its prestack coverage and updating its poststack data; and i) each operator node writing its updated poststack data from local memory to remote memory.

3. The method of claim 1, in said dividing step a), some of said nodes being operable as both an input and operator node.

4. The method of claim 1, said reading step b) comprising the substeps of partitioning the prestack seismic input data into contiguous, non-overlapping data blocks and transferring successive data blocks to the local memory of successive input nodes.

5. The method of claim 1, in said determining step c) the prestack seismic input data comprising trace data, for each input node the steps of determining the smallest individual rectangular bounding box enclosing the bins for each trace coverage the input node has loaded, and unioning all bounding boxes to create the smallest unioned bounding box enclosing all individual bounding boxes.

6. The method of claim 1, said broadcasting step d) comprising the substeps of each input node sending—a first message indicative of the size of the coverage and a second message indicative of coverage contained within its local memory.

7. The method of claim 1, said assigning step e) comprising the substeps of:

dividing the seismic survey into contiguous blocks of bins, partitioning each block into a plurality of subblocks with the number of subblocks equal to the number of operator nodes and the trace coverage in each subblock approximately equal.

8. A method of transferring poststack seismic data of a seismic survey area between remote memory and a plurality of local memories of a multiprocessor computer, where the seismic survey area comprising two-dimensions, columns and rows, of bins comprising the steps of:

dividing the seismic survey area into bin areas comprising one or more contiguous bins of seismic data;

arranging a data file of the poststack seismic data in remote memory as a sequence of data blocks where each block contains the data in a single bin and the sequential order of the blocks correspond to contiguity of the respective bins in one dimension;

coalescing sequential data blocks into data groups, where the corresponding bin groups have one dimension fixed and the other dimension variable, and transferring in a single operation the data file between remote memory and local memories where a first data group is transferred between remote memory and a first local memory and a second data group is transferred between remote memory and a second local memory.

9. The method of claim 8, where the one dimension fixed is the number of rows and the other dimension variable is the number of columns.

10. The method of claim 9, the number of rows being equal to the height of the bin area.

11. The method of claim 8, the seismic survey area comprising a rectangular array of bins which is a subset of a larger seismic survey.

12. The method of claim 8, the transferring step comprising a first transfer substep where the data file is read from remote memory into the local memories associated with operator processing nodes, and a second transfer substep where the data file is written from the local memories into the remote memory.

13. The method of claim 12, including the steps of the operator nodes:

retrieving prestack data from a plurality of input processing nodes;

applying a DMO operator to the prestack data;

updating the data file in each local memory prior to writing the data file to remote memory.

\* \* \* \* \*

UNITED STATES PATENT AND TRADEMARK OFFICE
CERTIFICATE OF CORRECTION

PATENT NO. : 5,537,319
DATED : July 16, 1996
INVENTOR(S) : Eric J. Schoen

It is certified that error appears in the above-indentified patent and that said Letters Patent is hereby corrected as shown below:

On the title page, item [54], Title and column 1 line 3, "MULTIPROCCESSOR" should read --- MULTIPROCESSOR ---.

Signed and Sealed this

Eighth Day of October, 1996

*Attest:*

BRUCE LEHMAN

*Attesting Officer*  *Commissioner of Patents and Trademarks*